United States Patent
Ma et al.

(10) Patent No.: US 7,997,714 B2
(45) Date of Patent: Aug. 16, 2011

(54) MATTING LIQUID FOR INK-JET PRINTING

(75) Inventors: Zeying Ma, San Diego, CA (US); Kai-Kong Iu, San Diego, CA (US); Gregg A. Lane, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1145 days.

(21) Appl. No.: 11/796,323

(22) Filed: Apr. 27, 2007

(65) Prior Publication Data

US 2008/0266371 A1 Oct. 30, 2008

(51) Int. Cl.
*G01D 11/00* (2006.01)

(52) U.S. Cl. .......................................... 347/100; 347/96

(58) Field of Classification Search .................. 347/100, 347/95, 96, 101; 106/31.27, 31.6, 31.13; 523/160, 161
See application file for complete search history.

(56) References Cited

U.S. PATENT DOCUMENTS

| | | | |
|---|---|---|---|
| 7,159,975 B2 | 1/2007 | Yue et al. | |
| 2004/0030001 A1* | 2/2004 | Ma et al. | 523/160 |
| 2005/0203210 A1* | 9/2005 | Kataoka et al. | 523/160 |
| 2005/0206705 A1 | 9/2005 | Ma et al. | |
| 2006/0007289 A1* | 1/2006 | Nito et al. | 347/100 |
| 2007/0052785 A1* | 3/2007 | Itoh et al. | 347/101 |

* cited by examiner

*Primary Examiner* — Manish S Shah

(57) ABSTRACT

A system and associated methods for printing matte and glossy images on a glossy media substrate including an ink set that includes at least one pigmented ink-jet ink including an anionic surface charged pigment dispersed in a first liquid vehicle and a substantially colorless matting liquid with at least one matting agent dispersed or solvated in a second liquid vehicle. Additionally, when the pigmented ink-jet ink is printed on the glossy media substrate alone, the pigmented ink-jet ink has a glossy appearance, and wherein when the colorless matting liquid is overprinted or underprinted with respect to the pigmented ink-jet ink on the glossy media substrate, the pigmented ink-jet ink combined with the matting liquid exhibits a visually perceptible matte appearance compared to the glossy appearance of the ink-jet ink printed alone.

14 Claims, No Drawings

MATTING LIQUID FOR INK-JET PRINTING

BACKGROUND OF THE INVENTION

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in ink-jet printing, accompanying this improvement are increased demands by consumers in this area, e.g., higher speeds, higher resolution, full color image formation, increased stability, flexibility in image manipulation and the creation of visual effects without decrease in quality or resolution, etc. The demand is even higher in the photo format printing arena because of the increasing use of digital cameras and other digital image capturing devices to create photo quality images as well as the manipulation of images to create other desired visual effects. As a result, ink-jet systems that can produce different photographic effects, such as a matte finish on glossy photo images without a significant increase in cost are highly sought after.

Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements One characteristic of ink-jet printing systems that is considered is related to image gloss when printed on various types of media substrates. Sometimes, a matte finish can be highly desirable because color appears softer with a matte finish. Furthermore, text with a matte finish can be easier to see than on glossier finishes. However, in order to achieve a matte finish, traditional methods have proved to be expensive and somewhat cumbersome. Accordingly, investigations continue into developing ink-jet systems and formulations that give text and photo quality images appropriate matte or gloss finish.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a pigment" includes reference to one or more of such materials.

As used herein, "liquid vehicle" is defined to include liquid compositions that can be used to carry colorants and/or other materials, such as pigment, matting agent, or the like, to a substrate. Liquid vehicles are well known in the art, and a wide variety of liquid vehicle components may be used in accordance with embodiments of the present invention. Such liquid vehicles may include a mixture of a variety of different agents, including without limitation, surfactants, co-solvents, buffers, biocides, viscosity modifiers, sequestering agents, stabilizing agents, and water. A liquid vehicle can also carry other solids or solubilized material, such as polymers, acids, UV curable materials, plasticizers, salts, etc.

As used herein, "pigment" refers to a colorant particle which is typically substantially insoluble in the liquid vehicle. Pigments that can be used include standard pigments that are dispersed by a separate dispersing agent, self-dispersed pigments that are surface modified by small molecules or polymeric dispersants, or polymer-encapsulated pigments. Often, the pigment will carry a negative charge.

As used herein, the term "reactive" when referring to ink sets refers to a chemical reaction between one or more pigment based ink-jet ink(s) and one or more matting liquid(s). Such reactive ink sets can be reactive by the use of salt mechanisms, pH differential mechanisms, precipitation or crashing mechanisms, or other known reactive mechanisms known to those skilled in the art.

The term "glossy" when referring to glossy media, glossy photo paper, etc., includes paper substrates that are coated with a non-paper coating which provides gloss to the surface. Exemplary glossy media includes those coated inorganic porous particulates, e.g., silica, alumina, clay, etc., bound together by a polymeric binder. It should be noted that media coated with inorganic particulates is not necessarily glossy. Matte coatings, for example, are not considered to be glossy, whereas semi-glossy to high-gloss coatings are considered to be glossy. Gloss levels of about 20 gloss units or greater are considered to be high gloss when measured at a 20 degree angle. Further, gloss levels of about 20 gloss units or greater are considered to be semi-gloss when measured at a 60 degree or 85 degree angle. Thus, any measurement above 20 gloss units (measured at 20, 60, or 85 degrees) is considered to be glossy in accordance with embodiments of the present invention.

As used herein, "matte" refers to either non-glossy, or reduced gloss finish that reduces glossy or semi-glossy sheen and light reflection, and which give a softer, satin finish to glossy photos. The term "matte" is therefore a relative term as it relates to the gloss level of a glossy or semi-glossy media substrate or glossy or semi-glossy image. Thus, a "matte" image is at least 10% in gloss units less glossy than a starting gloss level. It is believed that an at least 10% reduction in gloss units is visually perceptible. Reductions in gloss units can be at least 30%, at least 50%, or at least 80% in other embodiments and can provide a more dramatic change in gloss appearance. To be clear, "matte" does not required that the reduction in glossy appearance become matte, per se, but rather, becomes more matte or less glossy in a manner that is visually perceptible.

As used herein, "matting agent" refers to dispersed or solvated material in a matting liquid which when overprinted or underprinted with respect to a pigment-based ink-jet ink creates a desired matte finish or matted image.

The term "image" does not infer that what is printed is a single, unitary image. Thus, the term "image" includes all text, graphical, or photo markings printed on a single media substrate. Thus, for example, a photo printed next to textual information on a single media sheet would be considered an "image."

Though the benefits of the ink-jet ink compositions are described herein primarily with respect their performance on glossy media, it should be noted that these inks also perform well on other types of media. For example, though non-glossy coated papers and plain papers may not as fully benefit from the ability to print both glossy and matte images from a common ink set, general image quality improvements can be achieved when printing on porous, non-glossy media or plain paper.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, it has been recognized that it would be advantageous to develop a system for printing matted images in photo format printing, particularly on glossy photo images by combining matting liquid with pigmented inks. By combining the matting liquid with pigmented inks, one can effectively reduce gloss and achieve a matte finish on images that are printed on glossy substrates such as those used for photo format printing. The addition of certain matting agents within the matting liquid can decrease glossy appearance of the ink, even on a glossy substrate. Controlling the gloss can involve the use of salts, pH differentials, precipitation with pigments, use of opposite charges among different components, etc., for example. Advantages of such a printing system include image quality and cost reduction. The cost of the matting fluid is low. By utilizing such a system which imparts a matte effect, a softer, satin finish to glossy media can be achieved. This tends to soften colors as well as improve the appearance of any text on the glossy media. Such a finish also minimizes glossy sheen and light reflection on black and white or colored surfaces. Alternatively, images can also be printed that include both glossy portions and matter portions, which can have a visual appeal in certain circumstances, e.g., making certain portions of an image stand out, or printing text at a different gloss level than a photo image.

In accordance with an embodiment of the present invention, a system for printing matte and glossy images on a glossy media substrate from a single ink set are disclosed comprising a glossy media substrate and an ink set. The ink set comprises at least one pigmented ink-jet ink including an anionic surface charged pigment dispersed in a first liquid vehicle, and a substantially colorless matting liquid with at least one matting agent dispersed or solvated in a second liquid vehicle. Additionally, when the pigmented ink-jet ink is printed on the glossy media substrate alone, the pigmented ink-jet ink has a glossy appearance, and wherein when the colorless matting liquid is overprinted or underprinted with respect to the pigmented ink-jet ink on the glossy media substrate, the pigmented ink-jet ink combined with the matting liquid exhibits a visually perceptible matte appearance compared to the glossy appearance.

In accordance with another embodiment of the invention, a method of ink-jet printing an image with both glossy portions and matte portions can comprise printing a substantially colorless matting liquid onto a glossy media substrate, overprinting or underprinting a pigmented ink-jet ink with respect to the matting liquid on the glossy media substrate to form first image portion having a matte appearance; and printing the pigmented ink-jet ink on the glossy media substrate such that it does not contact the matting liquid, wherein a second image portion is formed having a glossy appearance.

Thus, in each of these embodiments, in the areas where the matte ink may be jetted onto the media substrate and then the matting liquid may be jetted (or over printed) on top of the ink, or the matting liquid may be jetted onto the media substrate and then the ink may be jetted on top of the matting liquid (the matting liquid is under printed beneath the ink-jet ink). Additionally, it is noted that the volume ratio of matting liquid to ink-jet ink on the printed glossy media substrate after the matting liquid has been under printed or over printed with respect to the ink-jet ink can be from about 1:20 to about 1:1, and is often from about 1:20 to about 1:3.

It is also noted that the ink set can include multiple pigmented ink-jet inks and a matting liquid or multiple matting liquids that can include multiple matting agents that when printed under or over the pigmented ink, react with one or more pigmented inks, precipitating the pigments in the inks and effectively reducing gloss even when printed on a glossy substrate such as glossy photo imaging paper.

The ink set and methods described herein can generate significant gloss differences merely by utilizing the matting liquid described herein in conjunction with the pigmented ink-jet ink in some portions of an image, and not in others. Further, the use of different volume ratios of matting liquid to ink-jet ink can also produce different levels of gloss reduction. For example, different levels of matting (or gloss) may be formed on different portions of the media sheet by using different matting-liquid-to-ink volume ratios. To illustrate, a first image portion can be printed with ink only, a second image portion can be printed with a first matting liquid to ink volume ratio, and a third image portion can be printed with a second matting liquid to ink volume ratio, etc. In this example, there may be three different gloss levels where the image portion printed with ink-jet ink by itself would have the most glossy appearance and the image portion with highest matting liquid to ink volume ratio would have the most matte appearance. In another embodiment, different image portions corresponding to different objects on the media sheet or different image portions corresponding to different parts of a single object may be formed with different gloss levels.

The matting liquid typically includes a liquid vehicle and from about 0.2 wt % to about 15 wt % of a matting agent, such as a cationic water-soluble polymer, an acid, and/or a multivalent salt. In another embodiment, the matting agent can be present in the matting liquid at from about 3 wt % to about 8 wt %.

Suitable matting agents can include, but are in no way limited to, reactive salts, acids, reactive polymers, and combinations thereof. Typically, these mechanisms can control gloss by destabilizing the pigment sufficiently to precipitate the pigment, thus forming matte finishes on printed images and text.

In one embodiment, the matting agent can be a reactive multivalent salt. Examples of suitable reactive multivalent salts can include, but are not limited to, salts of magnesium, calcium, lanthanum, aluminum, iron, and the like. In many embodiments of the present invention, magnesium and calcium reactive salts can be used as the reactive multivalent salt. In one aspect, the reactive multivalent salt can be a magnesium salt having an anion such as nitrate. In another aspect, the reactive multivalent salt can be a calcium salt having an anion such as nitrate. More specifically, in some embodiments, the reactive multivalent salt can be magnesium nitrate, calcium nitrate, lanthanum nitrate, aluminum nitrate, and mixtures thereof.

When reactive multivalent salts are used as the primary matting agent, the reactive multivalent salt is often present at from about 0.05 wt % to about 10 wt % of the ink-jet ink, and in some embodiments, from about 0.5 wt % to about 5 wt %, although concentrations outside this range can be suitable depending on the specific reactive salt.

In accordance with another aspect of the present invention, the matting agent can be a water-soluble cationic polymer. Examples of suitable reactive multivalent salts can include, but are not limited to, polyethyleneimine, polybiguanide, polyamine, or dicyandiamide resin or combinations thereof. The water-soluble can further be cationic.

In an additional embodiment, a pH differential gloss reduction mechanism can be used between the pigmented ink-jet ink and matting liquid. In such embodiments, the matting liquid can include an acid as the matting agent. A wide variety of acids can be used, as long as the acid does not interfere with other considerations in designing an ink-jet system, e.g., corrosion of ink-jet architecture, long-term ink stability, and the like. Non-limiting examples of particularly suitable acids include succinic acid, acetic acid, ascorbic acid, glutaric acid, glycolic acid, fumaric acid, citric acid, polyacrylic acid, tartaric acid, lactic acid, amino acids, malonic acid, maleic acid, phthalic acid (and its isomers), oxalic acid, and mixtures thereof. In one specific embodiment, the acid can be succinic acid.

When using such pH differential gloss reduction mechanisms, the pH differential can be from about 1 to about 6, and in some cases from about 2 to about 5. In one specific embodiment provided by way of example only, when using a pH mechanism, the pigmented ink-jet ink can have a pH from about 8 to about 9.5, while the matting agent can have a pH from about 4 to about 4.5. The acid can comprise from about 0.5 wt % to about 10 wt % of the ink-jet ink, and often is present at from about 1 wt % to about 3 wt %, although the actual values can depend on the specific acid used. Of course, concentrations outside of this range can also be used.

Typically, a pH sensitive colorant, most often a pH sensitive pigment dispersion, can be provided in one ink-jet ink, while the acid is included in a matting liquid. As such, when the pH sensitive colorant comes into contact with the acid, the pH sensitive colorant precipitates onto the substrate.

In yet another aspect, gloss reduction can be at least partially accomplished by including a surfactant in one or more of the ink-jet inks or matting liquid. In this way, the surfactant can increase the rate at which the inks penetrate vertically into a substrate rather than spread out horizontally across a substrate surface. Those skilled in the art will recognize that the use of surfactants can involve a careful balance of several factors such as penetration into the substrate versus loss of edge acuity and ink viscosity. Thus, at least one of the first pigmented ink-jet ink and matting liquid can further include a surfactant. Non-limiting examples of suitable surfactants can include nonionic surfactants such as secondary alcohol ethoxylates, diphenyl sulfonate derivatives, alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and combinations thereof. Most of these materials are available commercially under the tradenames TERGITOL, SURFYNOL, ZONYL, TRITON, MERPOL, and the like. If used, the amount of surfactant added to the ink-jet inks of this invention can range from about 0.01 wt % to about 10 wt %.

The pigment colorant can be any color suitable for a particular application. In one aspect, the pigment colorant can be black. In another aspect, the pigment colorant can be cyan, magenta, or yellow. Other colors can also be used, depending on the particular application and ink set design, e.g., red, green, blue, orange, pink, violet, etc.

In addition to the first pigmented ink-jet ink, it is often desirable to provide ink sets having multiple colors for producing a variety of images such as full color images. Therefore, the ink sets of the present invention can frequently include at least one additional pigmented ink-jet ink. For example, an ink set can include a black pigmented ink-jet ink, a black dye ink-jet ink, a cyan ink-jet ink, a magenta ink-jet ink, and a yellow ink-jet ink. It is noted that the ink set can include three, four, five, six, etc., ink-jet inks. In fact, many pigmented ink sets include around six to twelve pigmented ink-jet inks.

Most commonly known pigments can be incorporated into the ink-jet inks of the present invention. Pigments can be self-dispersed, polymer-dispersed, or the like. The pigments for use in the invention are not particularly limited, and inorganic pigments or organic pigments may be used.

Examples of black pigments that can be used include carbon pigments. The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. Such carbon pigments can be manufactured by a variety of known method such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

Similarly, a wide variety of colored pigments can be used with the present invention, therefore the following listing is not intended to be limiting. The following color pigments are available from Cabot Corp.: CABO-JET 250C, CABO-JET 260M, and CABO-JET 270Y. The following color pigments are available from BASF Corp.: PALIOGEN Orange, HELIOGEN Blue L 6901F, HELIOGEN Blue NBD 7010, HELIOGEN Blue K 7090, HELIOGEN Blue L 7101F, PALIOGEN Blue L 6470, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 1 OGX, Permanent Yellow G3R-01, HOSTAPERM Yellow H4G, HOSTAPERM Yellow H3G, Hostaperme Orange GR, HOSTAPERM Scarlet GO, and Permanent Rubine F6B. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow. Suitable inorganic pigments include, for example, titanium oxide, cobalt blue ($CoO$—$Al_2O_3$), chrome yellow ($PbCrO_4$), and iron oxide. Suitable organic pigments includes, for example, azo pigments, polycyclic pigments (e.g., phthalocyanine pigments, perylene pigments, perynone pigments, anthraquinone pigments, quinacridone pigments, dioxazine pigments, thioindigo pigments, isoindolinone pigments and quinophthalone pigments), dye chelates (e.g., basic dye type chelates and acidic dye type chelate), nitropigments, nitroso pigments, and the like. The above list of pigments includes the use of these pigments in as unmodified pigment particulates, small molecule attached pigment particulates, and polymer-dispersed pigment particulates. Unmodified pigments can be modified with small molecules or polymers to be used in accordance with embodiments of the present invention.

Small molecule-dispersed pigments refer to a type of self-dispersed pigment wherein a non-polymeric small molecule is attached to at least an outer shell of the pigment. For example, one type of pigment that is considered a small molecule-dispersed pigment is a carbon black pigment having a diazonium salt of an aromatic acid directly attached thereto by a covalent bond to the carbon.

The preparation of polymer-dispersed pigments can be by any of a number of methods. For example, polymeric resins can be attached to pigments by beginning with a diazonium attachment group, which can be attached to a base carbon of the pigment. The intermediate structure can then be treated with appropriate polymers to form anionic, cationic, or non-ionic black pigments. The reactive group can be a vinyl sulphone, for example, as vinyl sulphone groups can be a very versatile intermediate to attach polymers to carbon. Amines can readily add to the vinyl bond to form cationic or nonionic pigments. Further, thermal condensation with the amine attached pigments and styrene-acrylic acid polymers can then be used to form anionic pigments, if desired. There are also numerous other methods that can be used to prepare polymer-dispersed pigments, as are known by those skilled in the art.

More specific examples of pigments that can be used in accordance with embodiments of the present invention include those sold with HP printers, such as HP Designjet Z2100 and Z3100 Photo Printer Series, HP Photosmart Pro B9180, HP Designjet 5000 Series (the UV ink set).

As described previously, a liquid vehicle can be used to carry the pigment solids, the matting liquid, as well as other solids that may be present in the ink-jet compositions of the present invention. The liquid vehicle formulations that can be used in the inks and matting liquids of the present invention can include water, and optionally, one or more co-solvent present in total at from 5.0 wt % to 50.0 wt % by weight. One or more non-ionic, cationic, and/or anionic surfactant can also be present, and if present, can be included at from 0.01 wt % to 10.0 wt %. Other vehicle components known in the art such as biocides, viscosity modifiers, materials for pH adjustment, sequestering agents, preservatives, latexes, polymers, and the like, can also be present.

Classes of solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1-6-alcohols, ethylene glycol alkyl ethers, propylene glycol alkyl ethers, polyethylene glycol alkyl ethers, substituted and unsubstituted lactams, N-alkyl caprolactams, unsubstituted caprolactams, both substituted and unsubstituted formamides, both substituted and unsubstituted acetamides, and the like. Specific examples of solvents that can be used include 1-(2-Hydroxyethyl)-2-pyrrolidinone, 2-pyrrolidinone, and 1,6-Hexanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Viscosity modifiers and buffers may also be present, as well as other additives known to those skilled in the art to modify properties of the ink as desired. Such additives can be present at from 0.01% to 20% by weight.

EXAMPLES

The following examples illustrate the embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what is presently deemed to be the most practical and preferred embodiments of the invention.

Example 1

Polyethyleneimine/Calcium Ion-Containing Matting Liquid

A polyethyleneimine/calcium-ion-containing matting liquid can be prepared in accordance with Table 1, as follows:

TABLE 1

| Ingredient | Amount |
| --- | --- |
| Ethoxylated trimethylnonanol (vehicle) | 0.45 wt % |
| Olefine sulfonate (vehicle) | 0.2 wt % |
| 2-pyrrolidone (vehicle) | 5 wt % |
| Alkyl Diol (vehicle) | 10 wt % |
| TINNULOX ™ BBS (vehicle) | 100 ppm |
| Polyethyleneimine (matting agent) | 5 wt % |
| Calcium Nitrate•4H$_2$O (matting agent) | 2.5 wt % |
| Deionized Water (vehicle) | Balance | pH adjusted to about 4.0 with NaOH or HNO$_3$

Example 2

Polybiguanide-Containing Matting Liquid

A polybiguanide-containing matting liquid can be prepared in accordance with Table 2, as follows:

TABLE 2

| Ingredient | Amount |
|---|---|
| Propylene glycol n-propyl ether (vehicle) | 1 wt % |
| Alkyl Diol (vehicle) | 5 wt % |
| Fluorosurfactant (vehicle) | 0.3 wt % |
| Polyoxyethylene ether (vehicle) | 0.4 wt % |
| 2-pyrrolidone (vehicle) | 10 wt % |
| $Na_2EDTA$ (vehicle) | 0.1 wt % |
| Polybiguanide (matting agent) | 4 wt % |
| Deionized Water (vehicle) | Balance | pH adjusted to about 4.0 with NaOH or $HNO_3$

Example 3

Polyamine/Dicyandiamide Resin-Containing Matting Liquid

A polyamine/dicyandiamide-resin-containing matting liquid can be prepared in accordance with Table 3, as follows:

TABLE 3

| Ingredient | Amount |
|---|---|
| Propylene glycol n-propyl ether (vehicle) | 1 wt % |
| Alkyl Diol (vehicle) | 5 wt % |
| Fluorosurfactant (vehicle) | 0.3 wt % |
| Polyoxyethylene ether (vehicle) | 0.4 wt % |
| 2-pyrrolidone (vehicle) | 10 wt % |
| $Na_2EDTA$ (vehicle) | 0.1 wt % |
| Polyamine (matting agent) | 1.5 wt % |
| Dicyandiamide-resin (matting agent) | 1.5 wt % |
| Deionized Water (vehicle) | Balance | pH adjusted to about 4.0 with NaOH or $HNO_3$

Example 4

Citric Acid-Containing Matting Liquid

A citric acid-containing matting liquid can be prepared in accordance with Table 4, as follows:

TABLE 4

| Ingredient | Amount |
|---|---|
| Ethoxylated trimethylnonanol (vehicle) | 0.45 wt % |
| Olefine sulfonate (vehicle) | 0.2 wt % |
| 2-pyrrolidone (vehicle) | 5 wt % |
| Alkyl Diol (vehicle) | 10 wt % |
| TINNULOX ™ BBS (vehicle) | 100 ppm |
| Citric Acid (matting agent) | 4 wt % |
| Deionized Water (vehicle) | Balance | pH adjusted to about 4.0 with NaOH or $HNO_3$

Example 5

Calcium Ion-Containing Matting Liquid

A calcium-ion-containing matting liquid can be prepared in accordance with Table 5, as follows:

TABLE 5

| Ingredient | Amount |
|---|---|
| Ethoxylated trimethylnonanol (vehicle) | 0.45 wt % |
| Olefine sulfonate (vehicle) | 0.2 wt % |
| 2-pyrrolidone (vehicle) | 5 wt % |
| Alkyl Diol (vehicle) | 10 wt % |
| TINNULOX ™ BBS (vehicle) | 100 ppm |
| Calcium Nitrate•$4H_2O$ (matting agent) | 3 wt % |
| Deionized Water (vehicle) | Balance | pH adjusted to about 4.0 with NaOH or $HNO_3$

Example 6

Pigment-Containing Colored Inks

Colored inks for use with the matting liquid can be prepared, as follows:

TABLE 6

| Component | Cyan Ink (wt %) | Light Cyan Ink (wt %) | Magenta Ink (wt %) | Light Magenta Ink (wt %) | Yellow Ink (wt %) |
|---|---|---|---|---|---|
| Cyan Pigment | 2.0-6.0 | 0.5-1.5 | | | |
| Magenta Pigment | | | 2.0-6.0 | 0.5-1.5 | |
| Yellow Pigment | | | | | 2.0-6.0 |
| Polyacrylic | 0.3-2.5 | 0.3-2.5 | 0.3-2.5 | 0.3-2.5 | 0.3-2.5 |
| Glycol | 1.0-10.0 | 1.0-10.0 | 1.0-10.0 | 1.0-10.0 | 1.0-10.0 |
| Glycerol | 2.0-8.0 | 2.0-8.0 | 2.0-8.0 | 2.0-8.0 | 2.0-8.0 |
| 2-Pyrrolidinone | 2.0-18.0 | 2.0-18.0 | 2.0-18.0 | 2.0-18.0 | 2.0-18.0 |
| Diol | 1.5-6.0 | 1.5-6.0 | 1.5-6.0 | 1.5-6.0 | 1.5-6.0 |
| Surfactant | 0.05-2.0 | 0.05-2.0 | 0.05-2.0 | 0.05-2.0 | 0.05-2.0 |
| Buffer | 0.05-2.0 | 0.05-2.0 | 0.05-2.0 | 0.05-2.0 | 0.05-2.0 |
| Chelators | 0.1-0.5 | | | | |
| Biocide | 0.1-0.5 | 0.1-0.5 | 0.1-0.5 | 0.1-0.5 | 0.1-0.5 |

Example 7

Pigment-Containing Black and Gray Inks

Black and gray inks for use with the matting liquid can be prepared, as follows:

TABLE 7

| Component | Photo Black Ink (wt %) | Medium Gray Ink (wt %) | Light Gray Ink (wt %) |
|---|---|---|---|
| Black Pigment | 1.5-3.0 | 0.2-1.0 | 0.05-0.9 |
| Cyan Pigment | 0.2-1.2 | 0.02-0.5 | 0.01-0.3 |
| Violet Pigment | 0.2-1.2 | 0.02-0.5 | 0.01-0.3 |
| Polyacrylic | 0.3-2.5 | 0.3-2.5 | 0.3-2.5 |
| Glycol | 1.0-10.0 | 1.0-10.0 | 1.0-10.0 |
| Glycerol | 2.0-8.0 | 2.0-8.0 | 2.0-8.0 |
| 2-Pyrrolidinone | 2.0-18.0 | 2.0-18.0 | 2.0-18.0 |
| Diol | 1.5-6.0 | 1.5-6.0 | 1.5-6.0 |
| Surfactant | 0.05-2.0 | 0.05-2.0 | 0.05-2.0 |

TABLE 7-continued

| Component | Photo Black Ink (wt %) | Medium Gray Ink (wt %) | Light Gray Ink (wt %) |
|---|---|---|---|
| Buffer | 0.05-2.0 | 0.05-2.0 | 0.05-2.0 |
| Biocide | 0.1-0.5 | 0.1-0.5 | 0.1-0.5 |

Example 8

Gloss Reduction of Pigmented Ink by Matting Fluid

TABLE 8

| Measured at 20° | Ink Only | Gloss Units at 1:10 Volume Ratio | Gloss Units at 1:5 Volume Ratio | Gloss Units at 1:3 Volume Ratio | Gloss Units at 1:2 Volume Ratio | Gloss Units at 1:1.7 Volume Ratio | Gloss Units at 1:1.4 Volume Ratio | Gloss Units at 1:1 Volume Ratio |
|---|---|---|---|---|---|---|---|---|
| Magenta | 47 | 25 | 15 | 9 | 7 | 7 | 7 | 8 |
| Yellow | 52 | 28 | 18 | 11 | 8 | 9 | 9 | 10 |
| Blue | 39 | 20 | 14 | 10 | 10 | 10 | 8.5 | 6 |

Table 8 illustrates the effect of adding various volume ratios of the matting liquid of Table 3 to magenta, yellow, and blue inks (i.e. the gloss level measured at 20 degrees from the vertical). The samples are printed on HP Advanced Photo Glossy Paper, available from Hewlett-Packard Company (Palo Alto, Calif., U.S.A.), which has an initial 20-degree gloss level of about 36. Note that blue ink is magenta ink mixed with cyan ink.

The initial gloss units are of the ink only with no volume of matting fluid. The gloss units are about 47, 52 and 39 for magenta, yellow, and blue, respectively. Note that the difference in gloss from no matting liquid to a volume ratio of about 1:3 of matting liquid to ink-jet ink on the printed glossy media substrate produces a substantial decrease in the gloss levels of these inks. However, adding additional matting liquid beyond a ratio of about 1:3 has a relatively small effect on the gloss levels of the respective inks. Note also that at a 1:3 volume ratio, combining the magenta ink and the matting liquid reduces the gloss units of the magenta ink more than 500% by gloss units, combining the yellow ink and the matting liquid reduces the gloss units of the yellow ink more than 400% by gloss units, and combining the blue ink and the matting liquid reduces the gloss units of the blue ink almost 400% by gloss units.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A system for printing an image on a glossy media substrate with variable levels of gloss from a single ink set, comprising:
   a) a glossy media substrate;
   b) an ink set, comprising:
      i) at least one pigmented ink-jet ink including an anionic surface charged pigment dispersed in a first liquid vehicle; and
      ii) a substantially colorless matting liquid with at least one matting agent dispersed or solvated in a second liquid vehicle, wherein when the pigmented ink-jet ink is printed on the glossy media substrate alone, the pigmented ink jet ink has a glossy appearance, and wherein when the colorless matting liquid is overprinted or underprinted with respect to the pigmented ink-jet ink on the glossy media substrate, the pigmented ink-jet ink combined with the matting liquid exhibits a visually perceptible increased matte appearance compared to the glossy appearance.

2. The system of claim 1, wherein the matting agent is a water-soluble polymer.

3. The system of claim 2, wherein the water-soluble polymer is selected from polyethyleneimine, polybiguanide, polyamine, dicyandiamide resin, and combinations thereof.

4. The system of claim 1, wherein the matting agent is a reactive multivalent salt.

5. The system of claim 4, wherein the reactive multivalent salt is selected from magnesium nitrate, calcium nitrate, aluminum nitrate, lanthanum nitrate, iron nitrate and combinations thereof.

6. The system of claim 1, wherein the matting agent is an acid.

7. The system of claim 6, wherein the acid is selected from succinic acid, acetic acid, ascorbic acid, glutaric acid, glycolic acid, fumaric acid, citric acid, polyacrylic acid, tartaric acid, maleic acid, malonic acid, phthalic acid, phthalic acid isomers, lactic acid, amino acids, oxalic acid and combinations thereof.

8. The system of claim 1, wherein the ink set is configured to be printed on the glossy media substrate such that the volume ratio of matting liquid to ink-jet ink after the matting liquid has been under printed or over printed with respect to the ink-jet ink is from about 1:20 to about 1:1.

9. The system of claim 1, wherein the glossy media substrate is coated paper.

10. The system of claim 1, wherein ink set and glossy media substrate are formulated such that when the matting liquid and the ink-jet ink are printed on the glossy media substrate at a 1:1 volume ratio, the glossy appearance measured at a 20 degree angle of incidence is at least 20 gloss units greater than the increased matte appearance.

11. The system of claim 1, wherein ink set and glossy media substrate are formulated such that when the matting liquid and the ink-jet ink are printed on the glossy media substrate at a 1:3 volume ratio, the glossy appearance measured at a 20 degree angle of incidence is at least 300% in gloss units greater than the increased matte appearance.

12. The system of claim 1, wherein the system is configured to print both a matte and a glossy image on a single glossy media substrate.

13. The system of claim 1, wherein the matting agent is present in the matting liquid at from about 0.2 wt % to about 15 wt %.

14. The system of claim 1, wherein the matting agent is present in the matting liquid at from about 3.0 percent to about 8.0 percent by weight of the matting liquid.

* * * * *

UNITED STATES PATENT AND TRADEMARK OFFICE
CERTIFICATE OF CORRECTION

| | | |
|---|---|---|
| PATENT NO. | : 7,997,714 B2 | Page 1 of 1 |
| APPLICATION NO. | : 11/796323 | |
| DATED | : August 16, 2011 | |
| INVENTOR(S) | : Zeying Ma et al. | |

It is certified that error appears in the above-identified patent and that said Letters Patent is hereby corrected as shown below:

In column 12, line 2, in Claim 1, delete "ink jet" and insert -- ink-jet --, therefor.

Signed and Sealed this
Fifteenth Day of May, 2012

David J. Kappos
*Director of the United States Patent and Trademark Office*